US007341667B2

(12) United States Patent
Kennard et al.

(10) Patent No.: US 7,341,667 B2
(45) Date of Patent: Mar. 11, 2008

(54) PROCESS FOR REDUCTION OF INORGANIC CONTAMINANTS FROM WASTE STREAMS

(75) Inventors: Claude Kennard, Beachwood, OH (US); Michael A. Gonzalez, Wyoming, OH (US); David C. Szlag, Sault Ste. Marie, MI (US)

(73) Assignees: MAR Systems, LLC, Cleveland, OH (US); The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 10/976,519

(22) Filed: Oct. 29, 2004

(65) Prior Publication Data
US 2005/0194320 A1    Sep. 8, 2005

Related U.S. Application Data

(60) Provisional application No. 60/516,108, filed on Oct. 31, 2003.

(51) Int. Cl.
C02F 1/42 (2006.01)

(52) U.S. Cl. .................... 210/688; 210/912
(58) Field of Classification Search .......... 210/660, 210/681, 688, 911, 914, 912
See application file for complete search history.

(56) References Cited

U.S. PATENT DOCUMENTS

| 3,194,629 A | | 7/1965 | Dreibelbis et al. |
| 4,027,001 A | * | 5/1977 | Henderson et al. ......... 423/570 |
| 4,094,777 A | | 6/1978 | Sugier et al. |
| 4,101,631 A | | 7/1978 | Ambrosini et al. |
| 4,344,793 A | | 8/1982 | Burkett et al. |
| 4,474,896 A | | 10/1984 | Chao |
| 4,608,363 A | | 8/1986 | Goodboy |
| 4,640,751 A | | 2/1987 | Dyvik et al. |
| 4,824,576 A | * | 4/1989 | Sood et al. ................. 210/662 |
| 4,874,525 A | | 10/1989 | Markovs |
| 4,902,662 A | | 2/1990 | Toulhoat et al. |
| 4,911,825 A | | 3/1990 | Roussel et al. |
| 4,988,494 A | | 1/1991 | Lagas et al. |
| 5,064,626 A | | 11/1991 | Johnson et al. |

(Continued)

FOREIGN PATENT DOCUMENTS

EP    107582    5/1984

(Continued)

OTHER PUBLICATIONS

Carey, Todd R. et al. "Assessing Sorbent Injection Mercury Control Effectiveness in Flue Gas Streams." *Environmental Progress*, 2000, vol. 19, No. 3, 167-174.

(Continued)

Primary Examiner—Chester T. Barry
(74) Attorney, Agent, or Firm—Wilmer, Cutler, Pickering, Hale and Dorr LLP

(57) ABSTRACT

The invention relates to the use of used alumina to reduce the level of inorganic contaminants, such as mercury and arsenic, from waste fluid streams. The invention further provides a process for reducing the level of mercury or arsenic in fluid streams by contacting the fluid stream with used alumina, such as used Claus catalyst.

18 Claims, 6 Drawing Sheets

U.S. PATENT DOCUMENTS

| | | | |
|---|---|---|---|
| 5,071,475 A | 12/1991 | Barreau et al. | |
| 5,085,844 A | 2/1992 | Nowack et al. | |
| 5,107,060 A | 4/1992 | Yan | |
| 5,141,724 A | 8/1992 | Audeh et al. | |
| 5,223,145 A | 6/1993 | Markovs | |
| 5,242,482 A | 9/1993 | Cangini et al. | |
| 5,271,760 A | 12/1993 | Markovs et al. | |
| 5,330,560 A | 7/1994 | Chao et al. | |
| 5,354,357 A | 10/1994 | Markovs et al. | |
| 5,360,632 A * | 11/1994 | Johnson et al. | 427/212 |
| 5,360,779 A * | 11/1994 | Cheung et al. | 502/415 |
| 5,409,522 A | 4/1995 | Durham et al. | |
| 5,419,884 A | 5/1995 | Weekman et al. | |
| 5,441,648 A | 8/1995 | Lidzey | |
| 5,505,766 A | 4/1996 | Chang | |
| 5,507,238 A | 4/1996 | Knowles | |
| 5,523,067 A | 6/1996 | Markovs | |
| 5,569,436 A | 10/1996 | Lerner | |
| 5,597,729 A | 1/1997 | Easterly et al. | |
| 5,601,701 A | 2/1997 | Cameron et al. | |
| 5,601,795 A | 2/1997 | Ball et al. | |
| 5,607,654 A | 3/1997 | Lerner | |
| 5,649,262 A | 7/1997 | Walker et al. | |
| 5,667,694 A | 9/1997 | Cody et al. | |
| 5,670,122 A | 9/1997 | Zamansky et al. | |
| 5,672,323 A | 9/1997 | Bhat et al. | |
| 5,695,726 A | 12/1997 | Lerner | |
| 5,711,929 A | 1/1998 | Chalkley et al. | |
| 5,750,992 A | 5/1998 | Van Pelt et al. | |
| 5,766,567 A | 6/1998 | Voirin et al. | |
| 5,787,823 A | 8/1998 | Knowles | |
| 5,795,159 A | 8/1998 | Ralls et al. | |
| 5,803,663 A | 9/1998 | Matsuyama et al. | |
| 5,827,352 A | 10/1998 | Altman et al. | |
| 5,854,173 A | 12/1998 | Chang et al. | |
| 5,900,042 A | 5/1999 | Mendelsohn et al. | |
| 5,902,376 A | 5/1999 | Currie | |
| 5,928,617 A | 7/1999 | Grande | |
| 5,934,091 A | 8/1999 | Hanson et al. | |
| 5,944,196 A | 8/1999 | Oram et al. | |
| 5,965,095 A | 10/1999 | Owens et al. | |
| 5,989,486 A | 11/1999 | Washburn et al. | |
| 5,989,506 A | 11/1999 | Markovs | |
| 6,024,931 A | 2/2000 | Hanulik | |
| 6,103,205 A | 8/2000 | Wojtowicz et al. | |
| 6,117,333 A | 9/2000 | Frankiewicz et al. | |
| 6,129,843 A | 10/2000 | Petty et al. | |
| 6,136,281 A | 10/2000 | Meishcen et al. | |
| 6,136,749 A | 10/2000 | Gadkaree et al. | |
| 6,139,605 A | 10/2000 | Carnell et al. | |
| 6,156,214 A | 12/2000 | Lazarus | |
| 6,156,281 A | 12/2000 | Akers et al. | |
| 6,165,366 A | 12/2000 | Sarangapani | |
| 6,168,768 B1 | 1/2001 | Alexion et al. | |
| 6,224,740 B1 | 5/2001 | Gestermann et al. | |
| 6,244,055 B1 | 6/2001 | Hanson et al. | |
| 6,248,217 B1 | 6/2001 | Biswas et al. | |
| 6,258,334 B1 | 7/2001 | Gadkaree et al. | |
| 6,268,590 B1 | 7/2001 | Gale et al. | |
| 6,284,199 B1 | 9/2001 | Downs et al. | |
| 6,322,613 B1 | 11/2001 | Wojtowicz et al. | |
| 6,326,326 B1 | 12/2001 | Feng et al. | |
| 6,328,939 B1 | 12/2001 | Amrhein | |
| 6,491,887 B1 * | 12/2002 | Cheung et al. | 423/245.1 |
| 6,521,131 B1 | 2/2003 | Hamilton et al. | |
| 6,528,030 B2 | 3/2003 | Madden et al. | |
| 6,533,842 B1 | 3/2003 | Maes et al. | |
| 6,537,443 B1 | 3/2003 | Frankiewicz et al. | |
| 6,610,263 B2 | 8/2003 | Pahlman et al. | |
| 7,025,887 B1 | 4/2006 | Kirts et al. | |
| 7,160,405 B2 | 1/2007 | Kirts et al. | |
| 2003/0103882 A1 | 6/2003 | Biermann et al. | |
| 2003/0104937 A1 | 6/2003 | Sinha | |

FOREIGN PATENT DOCUMENTS

WO    WO 2006034487 A1 *   3/2006

OTHER PUBLICATIONS

Cyr, Patric J. et al. "A pilot scale evaluation of removal of mercury from pharmaceutical wastewater using granular activated carbon." *Water Research* 36, 2002. 4725-4734.

Flora, Joseph R.V. et al. "Modeling Sorbent Injection for Mercury Control in Baghouse Filters: I-Model Development and Sensitivity Analysis." *Journal of the Air & Waste Management Association*, Apr. 2003. 53: 478-488.

Flora, Joseph R.V. et al. "Modeling Sorbent Injection for Mercury Control in Baghouse Filters: II-Pilot-Scale Studies and Model Evaluation." *Journal of Air and Waste Management Association*, 2003. 53: 489-496.

Ghorishi, S. Behrooz et al. "Development of a CI Impregnated Activated Carbon for Entrained-Flow Capture of Elemental Mercury." *Environmental Science & Technology*, 2002. 36:4454-4459.

Harten, Teresa et al. "Separations Research at the United States EPA —Toward Recovery of VOCs and Metals Using Membranes and Adsorption Processes." Ch. 17 of *Green Engineering* edited by Anastas, Paul et al., American Chemical Society, 2000.

Lehamann, et al. "Activated Carbon Adsorbents from Waste Tires for Air Quality Control" *Air and Waste 92$^{nd}$ Annual Meeting and Exhibition*, 1999.

Scala, Fabrizio. "Simulation of Mercury Capture by Activated Carbon Injection in Incinerator Flue Gas. 1 In-Duct Removal." *Environmental Science & Technology* 2001, 35: 4367-4372.

Scala, Fabrizio. "Simulation of Mercury Capture by Activated Carbon Injection in Incinerator Flue Gas. 2 Fabric Filter Removal." *Environmental Science & Technology*, 2001. 35:4373-4378.

Yardim, M.F. et al. "Removal of mercury (II) from aqueous solution by activated carbon obtained from furfural." *Chemosphere* 52, 2003. 835-841.

Alcoa Product Data for Selexsorb HG.

Alcoa Product Data for Selexsorb HCl.

Nucon Information for Nusorb® Mersorb® Family of Adsorbents for Mercury Control.

New Projects Positioning Coal-Fired Utilities to Meet Possible Mercury Control Standards with New, Lower Cost Technologies; U.S. Department of Energy/Natural Energy Technology Laboratory website@http://204.154.137.14/publications/press/2000/tl_mercurycontrol_1.html; Issued on Aug. 14, 2000.

Arsenic in Drinking Water, www.freedrinkingwater.com/water-contamination/arsenic-contaminants-removal-water.htm, dated printed Jun. 27, 2007.

* cited by examiner

PROCESS FOR REDUCTION OF INORGANIC CONTAMINANTS FROM WASTE STREAMS

This invention was made with Government support under Cooperative Research and Development Agreement (CRADA) 0190-00, awarded by the U.S. Environmental Protection Agency. The Government has certain rights in this invention.

BACKGROUND OF THE INVENTION

1. Field of the Invention

This invention relates to the use of chemical sorbents to reduce the levels of contaminants from waste streams. In particular, the invention relates to the use of used alumina, enriched with sulfur, to reduce or eliminate inorganic contaminants, including, but not limited to heavy metals or D-block metals, from waste streams. More particularly, the invention relates to the use of used alumina to reduce the levels of mercury and arsenic from waste streams.

2. Background of the Invention

Industrial pollutants such as heavy metals, D-block metals, mercury and arsenic pose significant health-related risks to the public. For example, several metal ions and transition metal ions have been associated with asthma symptoms such as activation of mast cells and enhanced allergen-mediated mast cell activation. Walczak-Crzewiecka, et al. "Environmentally Relevant Metal and Transition Metal Ions Enhance Fcε RI-Mediated Mast Cell Activation," *Env. Health Perspectives* 111(5) (May 2003). Because these substances are generated as a by-product of industrial processes, it is important to find effective means to reduce their release into the environment.

For example, mercury emissions from coal-fired utilities, commercial boilers and solid waste incinerators represent a serious environmental problem and have been the focus of many regulatory deliberations. The Clean Air Act Amendments of 1990 (Tit. 1H, § 112(b)(1)) require major sources to use maximum available control technology to reduce mercury emissions. The United Nations has considered binding restrictions on the use of mercury through its environment program and has announced that it will begin to assist countries in developing methods for reducing mercury emissions. Lacey, M., "U.N. Conference Backs Efforts to Curb Mercury Pollution," *NY Times* (Feb. 10, 2003). At present, coal-fired power plants emit the largest source of mercury emissions at 32.7%. Municipal waste incinerators and non-utility boilers each contribute approximately 18% of mercury emissions. Medical waste incinerators contribute 10% of mercury emissions.

Mercury exposure has been associated with neurological and developmental damage in humans. Developing fetuses and young children are at particular risk of the harmful effects of mercury exposure. In a report prepared for Congress, the Environmental Protection Agency ("EPA") identified mercury as a particular danger to public health. Among other health-related concerns, the report identified increased levels of mercury in the blood of women of childbearing age. "Mercury Threat to Children Rising, Says an Unreleased EPA Report," *Wall St. J.*, Feb. 20, 2003, A1. Mercury contamination is also a concern for populations exposed to dental practices or dental waste, clinical chemistry laboratories, pathology laboratories, research laboratories, chlor-alkali facilities, and health care waste incinerators.

To address these concerns, the EPA proposed regulations that would require reductions in mercury emissions from coal-fired power plants. EPA Press Release, Dec. 14, 2000. In addition, legislation has been proposed that would cut mercury emissions by 50% by 2010 and by 70% by 2018. *Wall St. J.*, Feb. 20, 2003. However, despite the desire to reduce mercury emissions, presently there are no commercially available technologies to control mercury emissions. Id.

Similarly, exposure to arsenic poses potentially significant health risks. Arsenic is a natural element, distributed throughout the soil and in many kinds of rock. Because of its ubiquitous presence, arsenic is found in minerals and ores that contain metals used for industrial processes. When these metals are mined or heated in smelters, the arsenic is released into the environment as a fine dust. Arsenic may also enter the environment from coal-fired power plants and incinerators because coal and waste products contain some arsenic. Once arsenic enters the environment, it cannot be destroyed.

Arsenic exposure causes gastrointestinal problems, such as stomach ache, nausea, vomiting, and diarrhea. Arsenic exposure can also yield decreased production of red and white blood cells, skin changes that may result in skin cancer, and irritated lungs. Inorganic arsenic has been linked to several types of cancer and is classified as a Group A, human carcinogen. In high amounts (above about 60,000 ppb in food or water), arsenic may be fatal. Because of the serious adverse health effects related to arsenic, in 2001, the EPA issued regulations limiting the amount of arsenic in drinking water to 10 parts per billion. 66 *Federal Register* 6976.

Similar adverse effects have been associated with other inorganic contaminants such as cadmium, chromium, lead, and selenium. Cadmium, for example, is associated with chronic kidney, liver, bone and blood damage. Like mercury and arsenic, cadmium occurs naturally in metal ores and fossil fuels; industrial releases of cadmium are due to waste streams and leaching of landfills. Another contaminant, chromium, is associated with such long-term effects as damage to liver, kidney, circulatory and nerve tissues, as well as skin irritation. The level of chromium in drinking water is regulated by the Safe Drinking Water Act of 1974. Chromium is released to the environment through chemical manufacturing and combustion of natural gas, oil, and coal. Lead is another contaminant associated with negative health effects, such as brain and nerve damage in children, behavior and learning problems, and reproductive problems. Lead is released to the environment through various industrial processes.

Various carbon-based sorbents have been identified for removing mercury vapor from gas streams. T. R. Carey and C. F. Richardson, "Assessing Sorbent Injection Mercury Control Effectiveness in Flue Gas Streams," *Environmental Progress* 19(3):167-174 (Fall 2000). For example, Selexsorb® HG (Alcoa World Alumina, LLC, Pittsburgh, Pa.) and Mersorb® (Nucon International, Inc., Columbus, Ohio) are commercially available carbon-based mercury sorbents. Recycled tires have also been identified as a source of activated carbon that could be used for mercury removal. C. Lehmann et al., "Recycling Waste Tires for Air-Quality Control," January 2000. Activated carbon has many drawbacks for use in large-scale industrial processes, however. In particular, commercially available activated carbon is a relatively expensive sorbent. Although transformation of waste tires into activated carbon is an environmentally friendly means of recycling harmful waste, it is a complicated, lengthy, energy-intensive and time-consuming process. Additionally, the yield of activated carbon from waste tires is relatively low.

Thus, there is a need for new technologies to efficiently and cost-effectively reduce the level of inorganic contaminants, such as mercury and arsenic for example, in industrial emissions.

Activated alumina is a well-known sorbent. Industrial applications for activated alumina include: natural gas processing, dryers and forming, ethylene processing, petroleum refining, air separation, catalyst support, hydrogen peroxide manufacturing, and water treatment. Alumina has applications in ceramics, refractories, refining, abrasive materials, glass, cements and powder metallurgy, electrical applications, coatings, fibers, metallizing, and gas dehydration.

As used herein, "used alumina" is a by-product of a chemical or industrial process that enriches the alumina with sulfur or sulfur-containing compounds. A significant source of used alumina is the Claus process, which is used to recover elemental sulfur from hydrogen sulfide in gases. Industrial applications of the Claus process include, without limitation, steel production, oil refineries and natural gas refineries. Activated alumina is used as a catalyst in the Claus process. As more sulfur is deposited onto the activated alumina through the Claus process, the material loses its catalytic ability and becomes "spent" or "used."

Used alumina represents a significant source of industrial waste. Approximately 50,000 to 75,000 tons of used alumina are generated annually. Regeneration of used alumina, such as Claus catalyst is an expensive process, however. Because it is economically disadvantageous to regenerate the used alumina, much of the used alumina ends up in landfills. Thus, there also exists a need to recycle used alumina into other useful applications.

SUMMARY OF THE INVENTION

The inventors have discovered unexpected and surprising characteristics of used alumina. In particular, it has been discovered that used alumina that is enriched with sulfur is a particularly effective sorbent for reducing levels of inorganic contaminants from fluid streams. Nonlimiting examples of contaminants that can be reduced using used alumina are heavy metals, D-block metals, chalcogens, Group 15 metals, mercury, arsenic, chromium, cadmium, lead, and selenium.

In one aspect, the invention provides a process for removing mercury from waste streams using used alumina. Thus, the invention provides a useful means of recycling a material that is otherwise considered industrial waste. Moreover, by employing a recycling process, the inventive process provides significant cost savings over traditional methods that use commercially prepared sorbents used to remove pollutants from waste streams. For example, commercial sorbents Selexsorb® (Alcoa) and Mersrob® (Nucon) cost between five and seven dollars per pound, whereas the cost of used alumina recovered from the Claus process is less than one dollar per pound. In some embodiments, the sulfur-enriched alumina of the invention is effective at removing both ionic mercury and elemental mercury from industrial waste streams.

In one embodiment, the invention provides a process for reducing the level of an inorganic contaminant from a fluid stream by contacting the fluid stream with used alumina. In another embodiment, the invention provides a process for reducing the level of an inorganic contaminant from a fluid stream including the following steps: (1) flowing the fluid stream through a bed containing a sorbent that includes used alumina; (2) sorbing, either by adsorption or absorption, the inorganic contaminant from the fluid stream onto the surface of the sorbent; and (3) allowing the contaminant-depleted effluent stream to exit from the outlet of the bed. Nonlimiting examples of inorganic contaminants include: heavy metals, D-block metals, chalcogens, Group 15 metals, mercury, arsenic, chromium, cadmium, lead, and selenium. In some embodiments, the fluid stream is gaseous. In other embodiments, the fluid stream is liquid. In yet further embodiments, the mercury is ionic or elemental.

In one embodiment, the invention provides a process for reducing the level of mercury from a fluid stream by contacting the fluid stream with used alumina. In another embodiment, the invention provides a process for reducing the level of mercury from a fluid stream including the following steps: (1) flowing the fluid stream through a bed containing a sorbent that includes used alumina; (2) sorbing mercury from the fluid stream onto the surface of the sorbent; and (3) allowing the mercury-depleted effluent stream to exit from the outlet of the bed. In some embodiments, the fluid stream is gaseous. Gaseous fluid streams include, without limitation, those as a result of the burning of bituminous coal or Powder River Basin and lignite coal. In other embodiments, the fluid stream is liquid. In yet further embodiments, the mercury is ionic or elemental.

In a further aspect, the invention provides a process for removing arsenic from fluid streams using used alumina. In one embodiment, the used alumina is used Claus catalyst. In another embodiment, the invention provides a process for reducing the level of arsenic from a fluid stream including the following steps: (1) flowing the fluid stream through a bed containing a sorbent that includes used alumina; (2) sorbing arsenic from the fluid stream onto the surface of the sorbent; and (3) allowing the arsenic-depleted effluent stream to exit from the outlet of the bed. In some embodiments, the fluid stream is gaseous. In other embodiments, the fluid stream is liquid. In yet further embodiments, the arsenic is ionic or elemental.

DETAILED DESCRIPTION

Figure 1:
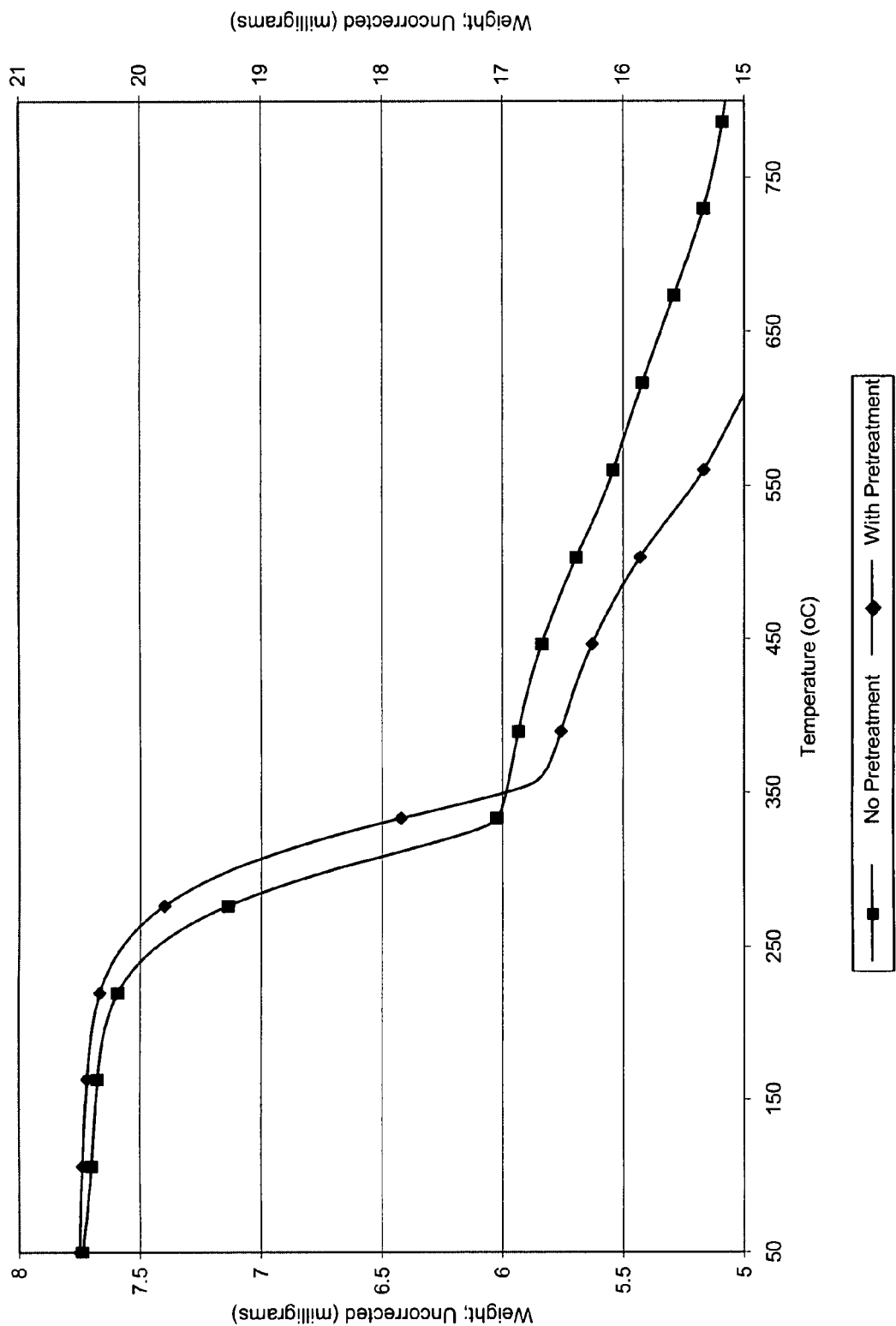
FIG. 1 is a graphical representation of the thermogravimetric analysis (TGA) of used alumina sample AA-191, as described in Example 6.

The patent and scientific literature referred to herein establishes knowledge that is available to those with skill in the art. The issued patents, applications, and references that are cited herein are hereby incorporated by reference to the same extent as if each was specifically and individually indicated to be incorporated by reference. In the case of inconsistencies, the present disclosure will prevail.

For purposes of the present invention, the following definitions will be used:

Definitions

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

The terms "used alumina" and "spent alumina" are used interchangeably herein to refer to alumina that is a by-product of a chemical or industrial process that enriches the alumina with sulfur or sulfur-containing compounds. In one nonlimiting example, one form of used alumina is a by-product of the Claus process, which uses activated alumina as a catalyst for removing or isolating sulfur. "Used alumina" or "spent alumina" is contrasted with virgin alumina, which has not been subjected to a chemical process. Thus, used alumina may contain higher levels of sulfur compared to virgin alumina.

The terms "sorbent," "sorb," "sorption" and their variants are used herein to refer to a substance that absorbs, adsorbs, or entraps something; the act of absorbing, adsorbing, or entrapping; or the process of absorbing, adsorbing, or entrapping. As used herein, these terms are not intended to be limited to a particular mode of entrapment, such as absorptive, adsorptive or other phenomena.

The invention provides processes for reducing the level of inorganic contaminants in fluid streams (e.g., gaseous or liquid) using used alumina. Nonlimiting examples of contaminants that may be reduced using the processes of the invention are heavy metals, D-block (i.e., transition) metals, chalcogens, Group 15 metals, mercury, arsenic, chromium, cadmium, lead and selenium. More particularly, the processes of the invention may be used to reduce the level of mercury and arsenic in fluid streams.

Without wishing to be bound by a particular theory, the inventors theorize that the unique bonding characteristics of sulfur make it a particularly good substance for interacting with a variety of contaminants. Sulfur has the ability to bond directly to all elements except the noble gases and nitrogen gas or liquid. Greenwood, N.N. and Earnshaw, A., "Chemistry of the Elements," Pergamon Press, (1984) at 782-783. Sulfur also has the ability to act as a ligand (i.e., an organic moiety off a metal center) and as an electron donor which allows it to react directly with a metal to form a S-M (metal) bond. The literature describes certain complexes which involve a sulfur molecule bonded directly to a metal center. Many amino acids are derivitized with a sulfur functionality and thus can bond with metals or enzymes. For example, hemoglobin utilizes a sulfur functionality. Therefore, it is believed that used, sulfur-enriched alumina is an effective sorbent for contaminants that have favorable sulfur-bonding characteristics.

In one aspect, the invention provides a process for reducing the level of mercury in fluid streams (e.g., gaseous or liquid) using used alumina. Applications of the invention in liquid systems include, without limitation, instrument manufacturing, gold mining, fluorescent lamp manufacturing and recycling, dental wastewater, chlor-alkali process, water purification, coal-fired utility scrubber washers and aqueous streams. Applications of the invention in gaseous systems include, without limitation, coal-fired power plants, natural gas, hydrogen, and air purification.

In some embodiments, at least about 50% of the contaminant is removed from the fluid stream. In other embodiments, at least about 75% of the contaminant is removed from the fluid stream. In still other embodiments, at least about 90% of the contaminant is removed from the fluid stream.

In some embodiments, at least about 50% of mercury is removed from the fluid stream. In other embodiments, at least about 75% of mercury is removed from the fluid stream. In still other embodiments, at least about 90% of mercury is removed from the fluid stream.

In another aspect, the invention provides a process for reducing the level of arsenic from a fluid stream using used alumina. In one embodiment, the used alumina is used Claus catalyst. In one embodiment, at least about 50% of arsenic is removed from the fluid stream. In another embodiment, at least about 75% of arsenic is removed from the fluid stream. In still another embodiment, at least about 90% of arsenic is removed from the fluid stream. In other embodiments, the arsenic is elemental arsenic. In further embodiments, the arsenic is ionic arsenic.

The amount of contaminant that is removed is also measured on a basis of the amount in a given time period. For example, in one nonlimiting embodiment, between about 10-100% of the contaminant is removed from the fluid stream within about 0.25-24 hours. In another embodiment, between about 10-100% of the contaminant is removed within about 1.5-2.5 hours. In still another embodiment, about 10-100% of the contaminant is removed within about 0.25-1.5 hours. In a further embodiment, about 10-100% of the contaminant is removed within about 1-24 hours. In other embodiments, about 95% of the contaminant is removed within about 1-24 hours. In another embodiment, about 60% of the contaminant is removed within about 1-24 hours. In still another embodiment, about 25% of the contaminant is removed within about 1-24 hours. In yet another embodiment, about 40% of the contaminant is removed within about 1-24 hours.

The contaminants that are decreased using the methods of the invention may be in elemental or ionic form. For example, in one embodiment, when using the processes of the invention to reduce the levels of mercury in fluid streams, the mercury is in the form of mercuric chloride. In another embodiment, the mercury is in the form of mercury nitrate. In a further embodiment, the mercury is in the form of elemental mercury (e.g., oxidation state is $Hg^0$). Similarly, other contaminants removed by the methods of the invention may be in elemental or ionic form.

The used alumina sorbent is introduced into the fluid stream as an aerosol or by aspiration, or on beads, as powders, or support on a membrane to facilitate removal of inorganic contaminants. In some embodiments, the sorbent is configured in a free-floating manner; in other embodiments, the sorbent is in a packed bed configuration. In still other embodiments, the sorbent is mixed with other materials in the sorbent bed. Non-limiting examples of such other materials include: other sorbents, silica or sand, glass wool, or molecular sieves. The fluid stream containing the inorganic contaminant is passed through the used alumina sorbent to facilitate reduction of the contaminant in the stream. In some embodiments, contaminant reduction is further facilitated by arraying the alumina in parallel configuration (i.e., the fluid stream is split into a series of parallel streams, each of which is associated with a sorption zone, each containing used alumina). In other embodiments, reduction is facilitated by arraying the alumina in series configuration (i.e., the fluid stream is passed through a series of successive sorption zones, each containing used alumina).

In one aspect, the process for reducing the level of inorganic contaminants in fluid streams comprises the steps of (a) flowing the fluid stream through a bed containing a sorbent that contains used alumina; (b) sorbing the inorganic contaminant from the fluid stream onto the surface of the sorbent; and (c) allowing the effluent stream to exit from the outlet of the bed. The size and configuration of the sorbent bed will vary, depending on the specific application. The appropriate bed system depends on the specific application and is readily ascertainable by those skilled in the art. For example, the steps for contaminant removal depend on the configuration of the flow stream, the temperature within the flow, and the flow rate.

In one nonlimiting example, a fixed bed contactor with an inlet and outlet is filled with used alumina. Nonlimiting examples of fixed bed contactors are columns and cartridges. The fluid stream is directed through the inlet end of the contactor through a piping system or other appropriate system, readily determinable by persons skilled in the art. As the fluid stream passes through the contactor containing the used alumina, the metal contaminant (e.g., mercury, arsenic, chromium, cadmium, etc.) is sorbed onto the surface of the alumina, thereby reducing the level of contaminant present in the fluid stream. The fluid stream is then allowed to exit the contactor through the outlet as effluent.

In some embodiments, the effluent stream is captured and recycled for other purposes or for further processing. In other embodiments, where contaminants are sufficiently removed from the fluid stream, the effluent is released to the environment or is recycled for other uses.

In addition to bed contactors, other removal systems, well-known to those of skill in the art, may be used to reduce the level of inorganic contaminants from fluid streams. In one embodiment, the used alumina is injected directly into the fluid stream. In this method, the used alumina is crushed into finely divided particles and dropped counter-current to the fluid stream. In one nonlimiting example, the particle size of the used alumina is fine enough to create an aerosol. In other nonlimiting examples, the alumina particles form a mist or a cloud. In some embodiments, the alumina is introduced to the fluid stream by injection or aspiration through a cylindrical collar that is placed in the fluid stream. As the alumina passes through the fluid stream, inorganic contaminants (e.g., mercury, arsenic, chromium, cadmium, etc.) sorb onto the surface of the alumina, thereby reducing the level of the contaminant from the fluid stream that has passed through the sorption zone created by the used alumina. A capture mechanism is then used to isolate and remove the mercury-containing alumina particles. Capture mechanisms are well-known to those of skill in the art. In one nonlimiting example, electrostatic particles (ESP) are used as a capture mechanism.

In another embodiment, the bag-house method is used to reduce the level of inorganic contaminants. This method is known to those of skill in the art. Briefly, in this method, used alumina is loaded into a bag-house, a permeable membrane container. Before being loaded into the container, the alumina is pulverized to a small particle size. The bag-house is placed in the flow of a fluid stream (e.g., a gaseous stream). As the fluid passes through the used alumina contained in the bag-house, inorganic contaminants contained in the stream are sorbed by the alumina.

In yet another embodiment, a batch contacting method is used to decrease the level of inorganic contaminants in fluid streams. In this embodiment, a predetermined amount of used alumina is placed in a volume of fluid. The fluid-alumina mixture is allowed to reach equilibrium, at which point no further inorganic contaminant will be removed from the fluid. In some embodiments, the mixture is agitated to hasten equilibrium. In other embodiments, the pH of the solution is adjusted to optimize contaminant removal. In one nonlimiting example, the pH of the mixture is adjusted to between about pH 4 and about pH 5.5. In yet further embodiments, the pH of the fluid is adjusted by adding nitric acid or an acid of similar acidity. The period for reaching equilibrium varies, depending on the size of the container, the capacity of the used alumina, the mass of the used alumina, the concentration of the contaminant, the amount of sulfur species on the alumina, and the species and type of contaminant being sorbed. For example, in some embodiments, when removing mercury from a fluid stream, the fluid-alumina mixture is agitated for between about 0.25 hours and about 48 hours. The used alumina is then separated from the fluid. In one nonlimiting embodiment, the used alumina is separated using filtration. In another nonlimiting embodiment, the used alumina is separated using gravity filtration. If the contaminant level of the fluid has not reached an acceptable level, successive batches are exposed to the alumina, in the manner described above.

The conditions under which the removal process is operated are adjusted for optimal reduction of the contaminant of interest. The conditions selected for optimization, as well as the range of each condition, will vary depending on the mode of the process (e.g., liquid or gas) and are well within the knowledge of those skilled in the art. Nonlimiting examples of operating conditions that are adjusted for optimal reduction include: pH, flow rate, temperature, residence time, flow mode, and amount of sorbent. The skilled artisan will recognize that each condition can be adjusted individually or in any combination with other conditions.

In some embodiments, the pH of the fluid stream is acidic, e.g., about pH 0-7. In another embodiment, the pH of the fluid stream is about pH 2-6. In a further embodiment, the pH of the fluid stream is about pH 2-4. In some embodiments, the pH of the fluid stream is basic, e.g., about pH 7-10. In some embodiments, the pH of the fluid stream is altered to achieve a particular pH range, while in other embodiments, the pH is "ambient", meaning it is unadjusted (i.e., the pH of the stream is its pH after the step immediately preceding the removal step of the invention). Methods for adjusting the pH of the fluid stream are well-known to those of skill in the art. Nonlimiting examples of such adjustment methods include: addition of base to increase pH or addition of acid to lower pH. Examples of suitable bases include, without limitation, NaOH, $NH_4OH$, $Ba_2OH$, KOH, and $Ce(OH)_4$. Examples of suitable acids include, without limitation, HCl, $H_2SO_4$, $HNO_3$, acetic acid, $H_3PO_4$, $HClO_4$, formic acid, HBr, HI, $NH_2SO_3H$.

The flow rate of the fluid stream is also adjusted in some embodiments to optimize the reduction of the contaminant(s). In one embodiment, the flow rate is about 0.5-1 L/min. In another embodiment, the flow rate is about 0.75-1.25 L/min. In a further embodiment, the flow rate is about 1.25-1.5 L/min. In yet another embodiment, the flow rate is about 1 L/min. In a still further embodiment, the flow rate is about 1.4 L/min.

In some embodiments, the temperature of the fluid stream is adjusted to optimize reduction of the contaminant(s). In one embodiment, the temperature is ambient. In another embodiment, the temperature is about 5-200° C. In another embodiment, the temperature is about 5-25° C. In a further embodiment, the temperature is about 20-50° C. In yet another embodiment, the temperature is about 50-100° C. In still another embodiment, the temperature is about 100-200° C. In yet a further embodiment, the temperature is about 140° C.

In some embodiments, the residence time is adjusted to optimize reduction of the contaminant(s). In some embodiments, the residence time is about 1 second to about 48 hours. In other embodiments, the residence time is about 1 hour to about 24 hours. In further embodiments, the residence time is about 1 hour to about 12 hours. In still other embodiments, the residence time is about 1 second to about 1 hour. In one embodiment, the residence time is about 0.05-1 second. In another embodiment, the residence time is about 0.05-0.25 second. In a further embodiment, the residence time is about 0.25-0.5 second. In yet another embodiment, the residence time is about 0.5-1.0 second. In some embodiments, the residence time varies with the temperature of the fluid stream. For example, in one nonlimiting embodiment, the residence time is about 0.23 second at about 23° C. In another nonlimiting embodiment, the residence time is about 0.17 second at about 140° C.

The flow mode of the invention is also varied depending on the conditions of the process. In some embodiments, the flow mode is vertical, i.e., downflow. In other embodiments, the flow mode is horizontal.

The amount of used alumina added to the sorbent bed is also varied to optimize the process of the invention. In one embodiment, about 0.1-100% of the sorbent bed is composed of used alumina. In another embodiment, about 0.1-1% of the bed is composed of used alumina. In a further embodiment, about 1-25% of the bed is composed of used alumina. In yet another embodiment, about 25-50% of the bed is composed of used alumina. In a still further embodiment, about 50-75% of the bed is composed of used alumina. In another embodiment, about 75-100% of the bed is composed of used alumina. In situations where the sorbent bed is composed of less than about 100% used alumina, non-limiting examples of materials comprising the remaining fraction of the sorbent bed include other sorbents, silica or sand, glass wool, and molecular sieve. Other materials known to those of skill in the art are also contemplated by the invention.

The used alumina of the invention may be any alumina recycled from a chemical or industrial process, in which the alumina is enriched with sulfur. In one non-limiting example, the sulfur-enriched used alumina is used (or recycled) Claus catalyst. In the Claus process, activated alumina is used as a catalyst to remove sulfur-containing compounds from fluid streams. Sulfur compounds react on the alumina surface to produce $S_2$ and water. Claus catalysts can be doped with $SiO_2$, $Fe_2O_3$, $Na_2O$, $TiO_2$, or Group VIB or VII metals. The alumina is rendered inactive, or "spent," when the alumina becomes rehydrated, or when the pores of the alumina become sulfated due to oxygen entering the system. At this point, the catalytic ability of the catalyst decreases. In some embodiments, the sulfur present in the used alumina catalyst is in the form of $S_4$, which most likely adheres to the alumina in the form of aluminum sulfate. In other embodiments, the sulfur is present in the form of sulfites or sulfones. In still more embodiments, elemental sulfur is present as a deposit on the surface of the alumina.

In some embodiments, the used alumina undergoes one or more processing steps before being used as a sorbent for inorganic contaminants (e.g., before the used alumina is loaded on the bed or into the sorbent zone). The processing steps expose a larger portion of the surface area of the alumina, thereby increasing the capacity of the alumina to sorb contaminants. The processing steps are performed with used alumina (e.g., Claus catalyst) after it has been enriched with sulfur. The processing steps increase the number of sorptive sites available on the alumina, thereby increasing its sorptive characteristics.

In one embodiment, the processing step includes crushing the alumina. Crushing the alumina increases the surface area of the particles, thereby exposing additional sorptive sites. Larger particle sizes are effective for removing contaminants from liquid streams, whereas smaller particle sizes (e.g., less than about 600 mesh or less than about 300 mesh) are required to effectively remove contaminants from gaseous streams. If the particles become too small, however, their sorptive capabilities may be hindered or eliminated due to a decrease in the framework size of the particle. In one non-limiting example, the alumina is crushed to less than about one millimeter in diameter. In another example, the alumina is crushed to less than about 0.5 millimeter. In yet another example, the alumina is crushed to less than about 0.1 millimeter. In still another example, the alumina is crushed to less than about 300 mesh. The particles are crushed using methods well known to those of skill in the art. The appropriate method for crushing the used alumina particles is chosen based on the ultimate particle size desired. Nonlimiting examples of crushing methods include, without limitation, a ball mill and mortar and pestle.

In another embodiment, the processing step comprises heating the alumina. In one nonlimiting example, the sulfur-enriched alumina is heated to less than about 600° C. In another nonlimiting example, the alumina is heated to less than about 500° C. The heating step drives off surface moisture, carbon, and other volatile material from the alumina. The heating step also affects the surface area of the alumina, however. For example, the surface area of activated alumina is between about 250-300 $m^2/g$, while the surface area of calcined alumina is between about 100-125 $m^2/g$. Calcined alumina is achieved by heating alumina to temperatures greater than about 1200° C. Therefore, the heating step should be performed at temperatures sufficient to remove moisture and volatile material, while avoiding conditions that would begin to affect particle size.

In another embodiment, the processing step includes heating the used alumina as described above, followed by crushing the particles, as described above. In still another embodiment, used alumina is heated then crushed prior to being further enriched with sulfur.

Effective sorption of contaminants is related to the amount of sulfur species on or in the sorbent. Thus, the ability of the sorbent to remove contaminants from fluid streams is optimized by manipulating the sulfur content of the used alumina. For example, higher levels of sulfur relate to improved sorption characteristics for mercury removal. As shown in Examples 6 and 7, used alumina sample AA-191 (Metal Alloy Reclaimers, Inc. II, Cleveland, Ohio ("Metaloy")), which has a sulfur content of 22.5%, removed 36% of mercury after one minute. In comparison, sample AA-222, which has an experimentally determined sulfur content of 1.5%, removed 24% of mercury after one minute. In contrast, sample AA-191 removed only 58% of arsenic from a test sample containing 100 ppm arsenic, whereas sample AA-222 removed 95% of arsenic from a similar sample (Example 8). Therefore, in some embodiments, the sulfur content of the alumina is in the range of about 1% to about 50%. In one embodiment, the sulfur content is at least about 25%. In another embodiment, the sulfur content is at least about 2%. In still another embodiment, the sulfur content is no more than about 25%. In yet another embodiment, the sulfur content is at least about 0.1%.

The sulfur content of the used alumina is manipulated by methods known to those of skill in the art. In one nonlimiting example, the mercury removal process employs used alumina "as is." That is, the sulfur content of the used alumina is not altered through further processing. In another embodiment, the desired sulfur content of the alumina is achieved by adding sulfur (i.e., doping or enriching) to either used or virgin alumina. Doping is achieved by methods well-known to those skilled in the art. One nonlimiting example of a doping method includes pretreating the alumina followed by exposing it to a gas stream consisting of hydrogen and sulfur-containing compounds. This method includes heating the alumina with nitrogen or an inert gas to remove air and dry the alumina. Once pretreatment of the alumina is achieved, the alumina is exposed to a gas stream that includes hydrogen and sulfur-containing compounds. Both hydrogen and sulfur must be present to convert the oxides on the alumina to sulfides. Nonlimiting examples of doping agents include carbon disulfide ($CS_2$), dimethylsulfide (DMS), dimethyldisulfide (DMDS) and other organic sulfides.

In another embodiment, the sulfur content of the used alumina is decreased by driving off excess sulfur. Sulfur removal is achieved by methods known by those with skill in the art. One nonlimiting example of a sulfur removal process is pre-reclaim burn, wherein the used alumina is heated in the presence of oxygen. Another method for reducing the sulfur content of used alumina is through dilution, a process by which used alumina containing higher levels of sulfur is mixed with used alumina containing lower levels of sulfur.

The dispersion characteristics of the sulfur on the surface of the sulfur-impregnated alumina are also correlated with improved contaminant sorption. For example, the inventors have observed that contaminant sorption is increased when the sulfur species is evenly distributed on the surface of the alumina. Without wishing to be limited to a particular theory, the inventors believe that when the sulfur species is clustered on the surface of the used alumina, the surface area available to sorb the contaminant is decreased. Thus, although there may be a greater mass of sulfur species on the used alumina, sorption will be decreased because of the lower surface area. Nonlimiting examples of methods to analyze dispersion characteristics are scanning electron microscopy, Brunauer Emmett Teller (BET) surface area analysis and porsimetry.

EXAMPLES

Example 1

Removal of Mercury from Liquid (Aqueous) Samples

The removal of ionic mercury(II) using used alumina was demonstrated using laboratory synthesized aqueous metal-tainted solutions. The solutions were prepared at two levels of mercury(II): 1 ppm and 10 ppm. Spent alumina samples (AA-199, AA-246, AA-222, AA-191, Metaloy) were used as sorbents for the liquid phase experiments. These sorbents were reclaimed from Claus catalyst processes. Used alumina was first dried by placing the sorbent in a drying oven, at 100° C. for approximately four hours. After drying, seven samples of sorbent were weighed. The samples were 0.1 g, 0.25 g, 0.25 g (two samples for precision), 0.5 g, 0.75 g, 1.0 g, and 1.5 g. The sorbent was added to the simulated waste sample (100 mL) and the contents of each bottle were manually swirled (1 minute) to assure complete wetting of all of the sorbent. Two control samples were also prepared. The first control contained no sorbent. The second control sample included virgin alumina that did not contain sulfur. The pH of each bottle was measured and adjusted to approximately pH 4.0 to approximately pH 5.5 with 1 M NaOH or 1M HCl, as needed. The bottles were agitated for up to 24 hours, followed by filtration and dilution for sample analysis.

Approximately 2-3 mL of sample was removed from each bottle and the sorbent was filtered from the solution. In a reaction vessel, 1 mL of sample was diluted to a total volume of 10 mL with 2% nitric acid. One drop of 5% potassium permanganate was added and the solution mixed. A three percent sodium borohydride was introduced into the vessel, resulting in the formation of mercury vapors and hydrogen gas. Mercury levels in the treated solutions were determined by cold vapor atomic absorption (CVAA) spectroscopy. The gas and vapor was passed through an absorption cell positioned in the path of the spectrophotometer. A standard curve was prepared using known concentration solutions. The curve was fit using linear regression analysis. The mercury concentration of each of the test samples was calculated by comparing the response obtained from the instrument to the standard curve.

The results are shown in Tables 1 and 2, below. These data are average results of multiple independent experiments for each alumina sample. Two experiments were performed for the 1 ppm sample. Four experiments were performed for the 10 ppm sample. Capacity is the amount of metal on the sorbent on a per gram of sorbent basis (mg of metal/g of sorbent).

TABLE 1

Average Removal of 1 ppm $Hg^{2+}$ from aqueous stream (n = 2)

| Lot | Theoretical Mass | % Removal | | $[Hg^{2+}]_e$ | | Capacity | |
|---|---|---|---|---|---|---|---|
| | | Average | SD | Average | SD | Average | SD |
| AA-199 | 0.10 | 91.16 | 0.57 | 0.088 | 0.001 | 0.892 | 0.062 |
| | 0.25 | 91.58 | 0.09 | 0.084 | 0.001 | 0.363 | <0.001 |
| | 0.50 | 93.70 | 2.03 | 0.063 | 0.020 | 0.189 | 0.003 |
| | 0.75 | 95.07 | 0.34 | 0.049 | 0.003 | 0.127 | 0.001 |
| | 1.00 | 94.61 | 0.91 | 0.054 | 0.009 | 0.095 | 0.001 |
| | 1.50 | 95.48 | 0.59 | 0.045 | 0.006 | 0.064 | 0.001 |
| AA-246 | 0.10 | 92.30 | 0.33 | 0.077 | 0.003 | 0.875 | 0.014 |
| | 0.25 | 92.65 | 0.21 | 0.073 | 0.002 | 0.359 | 0.022 |
| | 0.50 | 93.17 | 0.37 | 0.068 | 0.004 | 0.186 | <0.001 |
| | 0.75 | 93.65 | 0.03 | 0.064 | 0.001 | 0.125 | 0.001 |
| | 1.00 | 94.27 | 0.50 | 0.057 | 0.005 | 0.094 | <0.001 |
| | 1.50 | 94.49 | 0.55 | 0.055 | 0.006 | 0.063 | <0.001 |
| AA-222 | 0.10 | 92.56 | 2.40 | 0.075 | 0.023 | 0.926 | 0.011 |
| | 0.25 | 99.23 | 0.22 | 0.008 | 0.002 | 0.398 | 0.002 |
| | 0.50 | 99.51 | 0.04 | 0.005 | <0.001 | 0.199 | <0.001 |
| | 0.75 | 99.47 | 0.11 | 0.006 | 0.001 | 0.132 | 0.001 |
| | 1.00 | 99.47 | 0.05 | 0.006 | 0.001 | 0.099 | 0.001 |
| | 1.50 | 99.52 | 0.02 | 0.005 | <0.001 | 0.066 | <0.001 |
| AA-191 | 0.10 | 98.30 | 1.55 | 0.017 | 0.016 | 0.941 | 0.008 |
| | 0.25 | 99.14 | 0.38 | 0.009 | 0.004 | 0.398 | 0.005 |
| | 0.50 | 99.38 | 0.09 | 0.006 | 0.001 | 0.199 | 0.001 |
| | 0.75 | 99.37 | 0.05 | 0.006 | <0.001 | 0.133 | 0.001 |
| | 1.00 | 99.39 | 0.01 | 0.006 | <0.001 | 0.100 | 0.001 |
| | 1.50 | 99.41 | 0.01 | 0.006 | <0.001 | 0.066 | <0.001 |

TABLE 2

Removal of 10 ppm $Hg^{2+}$ from aqueous stream (n = 4)

| Lot | Theoretical Mass | % Removal Average | SD | $[Hg^{2+}]_c$ Average | SD | Capacity Average | SD |
|---|---|---|---|---|---|---|---|
| A-246 | 0.10 | 87.078 | 4.21 | 1.292 | 0.421 | 8.689 | 0.402 |
|  | 0.25 | 88.666 | 3.78 | 1.133 | 0.378 | 3.544 | 0.117 |
|  | 0.50 | 83.109 | 12.81 | 0.939 | 0.384 | 1.807 | 0.078 |
|  | 0.75 | 93.191 | 3.34 | 0.681 | 0.335 | 1.242 | 0.044 |
|  | 1.00 | 95.224 | 2.68 | 0.478 | 0.268 | 0.951 | 0.025 |
|  | 1.50 | 98.685 | 0.98 | 0.132 | 0.098 | 0.658 | 0.006 |
| AA-222 | 0.10 | 88.124 | 3.73 | 1.188 | 0.372 | 8.766 | 0.123 |
|  | 0.25 | 95.419 | 3.10 | 0.458 | 0.310 | 3.795 | 0.132 |
|  | 0.50 | 99.031 | 0.62 | 0.097 | 0.062 | 1.980 | 0.014 |
|  | 0.75 | 99.021 | 0.40 | 0.098 | 0.039 | 1.319 | 0.009 |
|  | 1.00 | 98.873 | 0.22 | 0.113 | 0.022 | 0.989 | 0.002 |
|  | 1.50 | 98.373 | 2.46 | 0.163 | 0.246 | 0.655 | 0.016 |
| AA-191 | 0.10 | 89.887 | 2.63 | 1.019 | 0.267 | 8.806 | 0.219 |
|  | 0.25 | 96.899 | 2.35 | 0.311 | 0.234 | 3.849 | 0.095 |
|  | 0.50 | 97.362 | 4.87 | 0.265 | 0.487 | 1.940 | 0.102 |
|  | 0.75 | 99.766 | 0.07 | 0.023 | 0.007 | 1.328 | 0.001 |
|  | 1.00 | 99.798 | 0.04 | 0.021 | 0.003 | 0.997 | 0.005 |
|  | 1.50 | 99.823 | 0.03 | 0.017 | 0.005 | 0.667 | 0.003 |
| AA-199 | 0.10 | 90.155 | 4.76 | 0.985 | 0.476 | 9.037 | 0.440 |
|  | 0.25 | 91.277 | 2.25 | 0.872 | 0.225 | 3.639 | 0.096 |
|  | 0.50 | 94.231 | 2.25 | 0.577 | 0.225 | 1.887 | 0.042 |
|  | 0.75 | 95.262 | 1.32 | 0.474 | 0.132 | 1.272 | 0.018 |
|  | 1.00 | 96.386 | 1.50 | 0.361 | 0.150 | 0.966 | 0.015 |
|  | 1.50 | 97.301 | 1.56 | 0.270 | 0.156 | 0.649 | 0.010 |

These data confirm that as little as 0.1 g/mL of used alumina is effective at removing as much as 10 ppm of mercury from aqueous waste samples. Moreover, because the mercury content in the control samples (containing no alumina) did not decrease, these experiments demonstrate that the loss in mercury is a result of the sorption phenomenon and not due to precipitation. The effectiveness in removing mercury from the samples increased slightly as more sorbent was added, but was still effective at the lower levels. In addition, the inability of the virgin alumina control samples to decrease the mercury levels in the samples confirms the sorption is due to the presence of sulfur on the used alumina.

Example 2

Removal of Mercury from Gas Samples

In this prophetic example, used alumina (Claus catalyst) sorbents will be screened using an on-line mercury analyzer, which allows monitoring of outlet mercury concentration from the reactor in real time, thereby reducing the extensive number of tests that need to be performed in order to determine when equilibrium has been achieved. Because the oxygen present in simulated flue gas interferes with the on-line analysis, the screening will be performed using either nitrogen or argon carrier gas. The sorbents will be tested in range of 70° C. and 150° C. The amount of mercury sorbed on the sorbents will be determined by CVAA spectroscopy, by leaching the mercury off the sorbent.

After the initial screening tests, additional tests will be conducted using simulated flue gas, which requires a batch sampling method using impingers (Ontario Hydro Method, known to those of skill in the art). Three tests at different contact time periods will be performed, to assure that equilibrium is obtained. The mercury will be dosed into the system by an apparatus that diffuses known concentrations of mercury into a system. The apparatus is a mercury-filled u-shaped tube. A predetermined flow of gas will then be bubbled into the tube to distribute the mercury. The quantity of mercury being dosed into the system will be calculated based on the known vapor pressure of mercury and the known flow rate.

Example 3

Removal of Mercury from Gas Samples—Experiment #2

General Procedure

In this prophetic example, an elemental mercury ($Hg^0$) permeation tube (3 cm, Vici Metronics, Inc) is used to steadily provide $Hg^0$ vapor into the system. The $Hg^0$ is introduced into the system using nitrogen at a flow rate of about 100 mL $min^{-1}$ as a carrier gas, which is passed over the permeation tube. The carrier gas flow rate is maintained with the use of a mass flow controller (MFC). Release of $Hg^0$ vapor at a rate of 91 ng $min^{-1}$, (11 parts per billion by volume inlet $Hg^0$ concentration) is achieved by immersing the permeation tube in a temperature-controlled water bath (about 55.5° C.). The influent $Hg^0$ vapor concentration is repeatedly measured with 4% (w/v) $KMnO_4$/10% (v/v) $H_2SO_4$ impinger solutions.

Simulated flue gas is chosen from one of two types: bituminous coal and Powder River Basin (PRB), based on the type of coal that is present. Bituminous coal results in a higher percentage of oxidized mercury, while PRB coal results in higher percentage of elemental mercury. The simulated flue gas of PRB and lignite coals primarily consists of 3%(v) oxygen ($O_2$), 12%(v) carbon dioxide ($CO_2$), 7%(v) water ($H_2O$), 500 ppm by volume sulfur dioxide ($SO_2$), 200 ppm by volume nitrous oxide (NO), and 11 ppb by volume elemental mercury ($Hg^0$) balanced with nitrogen ($N_2$) gas. For PRB, the simulated mixture is prepared by blending separate streams of gases supplied from pressurized gas cylinders of 0.98%(v) $SO_2$ in $N_2$, 4140 ppm by volume NO in $N_2$, a mixture of 80%(v) $C_2$ and 20%(v) $O_2$, and $N_2$ gas humidified via a flask containing water maintained at 47° C. to approximate a 7%(v) water vapor concentration. The flow rates of all of these gases are separately controlled by individual mass flow controllers (MFC). The total 1 L $min^{-1}$ at 23° C. of gas flow is supplied to a fixed-bed reactor inlet through preheated Teflon lines with a heating tape to prevent water condensation. Then, the total stream enters the on-line mercury analyzer and its effluent gas stream is captured by an impinger train to analyze the mercury contents by a CVAA spectrophotometer.

Blank Experiments

Blank experiments are carried out to examine the sorption of mercury vapor on the tubing, reactor, and blank glass fiber filter. The system is cleaned with 10%(v/v) nitric acid and de-ionized water before each experiment to remove residual mercury in the system as described in Section 8.6.2 of the Ontario Hydro Method (http://rmb-consulting.com/download/ontariohg.pdf).

Analytical

An on-line Hg analyzer is used to obtain breakthrough curves and to study the dynamic sorption capacity of the tested sorbents. The analyzer is calibrated using the calibrated $Hg^0$ permeation tube and the mercury detection limit is determined. The analyzer is designed to detect only $Hg^0$ vapor in the gas stream, and cannot detect any oxidized mercury portion. When mercury sorption tests are conducted in the system, the effluent mercury can be fully or partially oxidized due to reactions between elemental mercury, a sorbent, and other simulated flue gas components. Therefore, the oxidized mercury, if formed, is captured with an impinger containing either tris(hydroxymethyl)aminomethane (tris) solution or potassium chloride (KCl) solution prior to $Hg^e$ detection using an on-line mercury analyzer.

The tris solution method (Radian Corp.) has been shown to be effective in capturing only oxidized mercury in other Electric Power Research Institute (EPRI) studies. Carey, T. R.; Hargrove Jr., O. W.; Richardson, C. F.; Chang, R.; Meserole, F. B. Factors Affecting Mercury Control in Utility Flue Gas Using Activated Carbon. *J. Air & Waste Manage. Assoc.* 1998, 48, 1166. The KCl solution is the first impinger set used in the Ontario Hydro Method to determine oxidized mercury. Other gas components in the simulated flue gases such as $SO_2$, HCl, and $H_2O$ are also known to interfere with 253.7-nm ultra violet (UV) irradiation emitted from a mercury lamp in the on-line mercury analyzer. Therefore, the gas passing through the tris or KCl solution flows through another sodium carbonate ($Na_2CO_3$) buffer solution to remove $SO_2$ and HCl from the effluent gas stream. The effluent gas stream goes through an empty impinger placed in an ice bath as a water trap before $Hg^e$ is finally detected with the on-line mercury instrument. Then, the total stream leaving the on-line mercury analyzer is captured by an Ontario Hydro impinger train to analyze the mercury contents by the CVAA spectrophotometer.

Fixed-Bed Sorption Experiments

The used alumina is tested using the on-line mercury analyzer for monitoring the effluent $Hg^0$, and an Ontario Hydro impinger train under the simulated flue gas to validate the system performance. The sorbent samples are mixed in silica diluent ($SiO_2$, Fisher Scientific, fine granules, particle size: 149-420 μm) prior to being packed in the reactor. About 20-30 mg of each sorbent in 6 g of silica is used and the bed material is supported by a fritted quartz disk with a Teflon o-ring and a glass fiber filter with a nominal 1 μm pore diameter in order to minimize channeling and prevent the escaping sorbent through the bed. Typical test conditions are summarized in Table 3, below. An additional filter system with a glass fiber filter with a nominal 0.7 μm pore diameter is used at the outlet of the reactor to capture sorbent particles potentially escaping from the bed.

TABLE 3

Summary of test conditions

| Item | Exemplary Test Conditions |
| --- | --- |
| Reactor | ½-in. (1.28 cm) i.d. borosilicate |
| Temperature (° C.) | 140 |
| Flow rate (cm³/min) | 1,000 @ 23° C.; 1,395 @ 140° C. |
| Flow mode | downflow |
| Superficial velocity in an empty reactor (cm/s) | 13 @ 23° C.; 18 @ 140° C. |
| Residence time in an empty reactor (s) | 0.23 @ 23° C.; 0.17 @ 140° C. |
| Sorbent | 20-30 mg in 6 g of a sand bed |
| Gas | PRB/lignite simulated flue gas |
| Inlet $Hg^0$ concentration | 91 ng/min = 11 ppbv = 78 ppbw = 91 μg/Nm³ |
| Sorption capacity determination | Up to 90% total breakthrough; impinger solution analysis |

During each test, the mercury-laden inlet gas bypasses the sorbent bed and is passed to the analytical system until the desired inlet mercury concentration is established. Then, the sorption test is initiated by diverting the gas flow through the sorbent column in downflow mode to minimize the potential for fluidization of the bed. All of the tubing and valves in contact with elemental mercury are constructed from Teflon, which has been demonstrated to have good chemical resistance and inertness toward elemental mercury. The sorbent bed and filter system is placed in a temperature-controllable convection oven, which can maintain the system temperature within 0.5° C. A Teflon coated thermocouple is installed in the fixed-bed reactor to control the gas temperature at the inlet of the sorbent bed.

When mercury speciation studies are conducted, an impinger train employed from the Ontario Hydro Method for collection of mercury samples is placed on the outlet side of the system. The total gas flow rate is monitored at the outlet of the impinger system using a bubble flow meter.

Example 4

Dispersion of Sulfur on the Surface of Used Alumina

The dispersion characteristics of sulfur on the surface of used alumina were investigated by scanning electron microscopy (SEM). Each sample was ground into a powder in an agate motor and pestle and then passed through a 600 mesh sieve to assure uniform sample size.

SEM analysis was performed on virgin alumina Maxcell 727 (Porocel Adsorbents, Catalysts & Services, Little Rock, Ark.) and UOP S-201 (UOP LLC, Des Plaines, Ill.) to establish a baseline for comparison with the sulfur-containing samples. Both materials are pure white powders. The pore structure of Maxcell 727 was relatively open and exhibited only the alumina support; no surface species (sulfur) was detected. Compared to the Maxcell sample, the pore structure of the UOP S-201 was not as open; it also did not exhibit a surface (sulfur) species.

SEM analysis was performed on four samples of used alumina, AA-222, AA-199, AA-246, and AA-191 (Metaloy). AA-222 exhibited tight pore structure, similar to UOP S-201. Small aggregates were observed on the surface of the support. Elemental Diffraction Analysis (EDAX) indicated the presence of approximately >2% sulfur, based on counts per second. The EDAX data suggests that the aggregates observed in the SEM are sulfur species. AA-199 indicated the presence of approximately >2% sulfur, based on EDAX analysis. The SEM also showed the presence of sulfur aggregates. AA-246 exhibited tight pore structure, similar to UOP S-201. The sulfur species was present at approximately >1% (EDAX). The SEM showed fewer aggregates on the surface of the alumina compared to the other samples. AA-246 also exhibited tight pore structure, similar to UOP S-201. The sulfur species was present at approximately 20% (EDAX). The SEM showed a uniform dispersion of sulfur aggregates in a higher concentration than the other samples. The distribution of the sulfur in each of the Metaloy samples was ubiquitous and evenly distributed on the surface of the alumina, regardless of the total amount of sulfur present. The data are summarized in Table 3.

TABLE 4

Surface dispersion of sulfur on used alumina

| Sample | Description | EDAX | SEM |
|---|---|---|---|
| Maxcell 727 | Pure white powder | n/a | No surface species |
| UOP S-201 | Pure white powder | n/a | No surface species |
| AA-222 | Slightly gray powder | >2% | Small aggregates |
| AA-199 | Pale white-gray powder | >2% | Small aggregates |
| AA-246 | White powder | >1% | Almost no aggregates |
| AA-191 | Yellow powder; strong sulfur odor | ~20% | Evenly dispersed aggregates |

These data demonstrate that, while the quantity of sulfur may vary from sample to sample, the sulfur deposited on the used alumina is uniform in size and distribution.

Example 5

X-Ray Powder Diffraction Analysis of Alumina

X-ray powder diffraction (XRD) was used to identify the type of surface species present in used alumina samples from the Claus process. The technique also determined if any phase changes of the alumina support occurred as a result of the Claus process.

Analysis was performed on powdered samples and mounted using the accepted standard analysis technique. The sample is crushed to a consistent size, no passing through a mesh is needed. The crushed powder is then introduced into a stainless steel holder using a backfilling technique. The backfilling allows the sample to be pressed into the sample holder which enables the sample to remain in place. The backfilling technique also increases the random order of the packing of the sample. The lamp sources of Cu-α and the scanning 2θ region was from 10-70 degrees.

Analysis of UOP S-201 and Maxcell 727 did not indicate the presence of a surface species. The spectra were representative of the spectra for alumina oxide ($Al_2O_3$). The form was γ-alumina, with a small portion of α-alumina. The two spectra were nearly identical, indicating the same phase of alumina, with major peaks at 28, 38, 43, 50, and 68 2θ values.

Two samples of amorphous activated carbon used for mercury sorption were also analyzed as a comparison. Mersorb® (Nucon) and Selexsorb® (Alcoa) where each showed a sharp spike at 27 2θ, which appeared to be crystalline and indicates the possible presence of a sulfide ($S^{2-}$) species.

Four samples of used alumina were analyzed (AA-199, AA-222, AA-246, and AA-191, Metaloy). The spectra confirmed that these samples shared the same phase-support as the two virgin materials, UOP S-201 and Maxcell 727. These data confirm that no phase change of the alumina occurs due to the Claus reaction and also that the sulfur is not incorporated into the alumina framework.

An increase in intensity was observed among the used alumina samples, which is attributed to the presence of sulfur on the surface of the alumina. The spectra for all four samples were comparable, showing peaks at 28, 38, 43, 58 and 68 2θ. The particular sulfur species could only be determined for AA-191, which had significantly more sulfur content than the other samples. The relatively small amount of sulfur present in the other samples prohibited determination of sulfur species. Sample AA-191 showed additional spikes at 23, 26, 28 2θ, which were further analyzed and determined to be the $S_8$ form of sulfur.

Example 6

Thermogravimetric Analysis of Used Alumina

Thermogravimetric analysis (TGA) was also used to determine the quantity of sulfur species on used alumina from the Claus process. In the experiments, about 6-9 mg of sample was crushed into a powder and exposed to an oxygen environment. The sample was then heated at a rate of 20° C. per minute until the temperature reached 800° C. The samples were analyzed twice, once without pretreatment, and a second time with pretreatment which included heating for 24 hours at 110° C.

As a control, two virgin materials (UOP S-201 and Maxcell 727) were analyzed. Two samples of activated carbon sorbent, Mersorb® and Selexsorb®, were also included for comparison.

Figure 2:
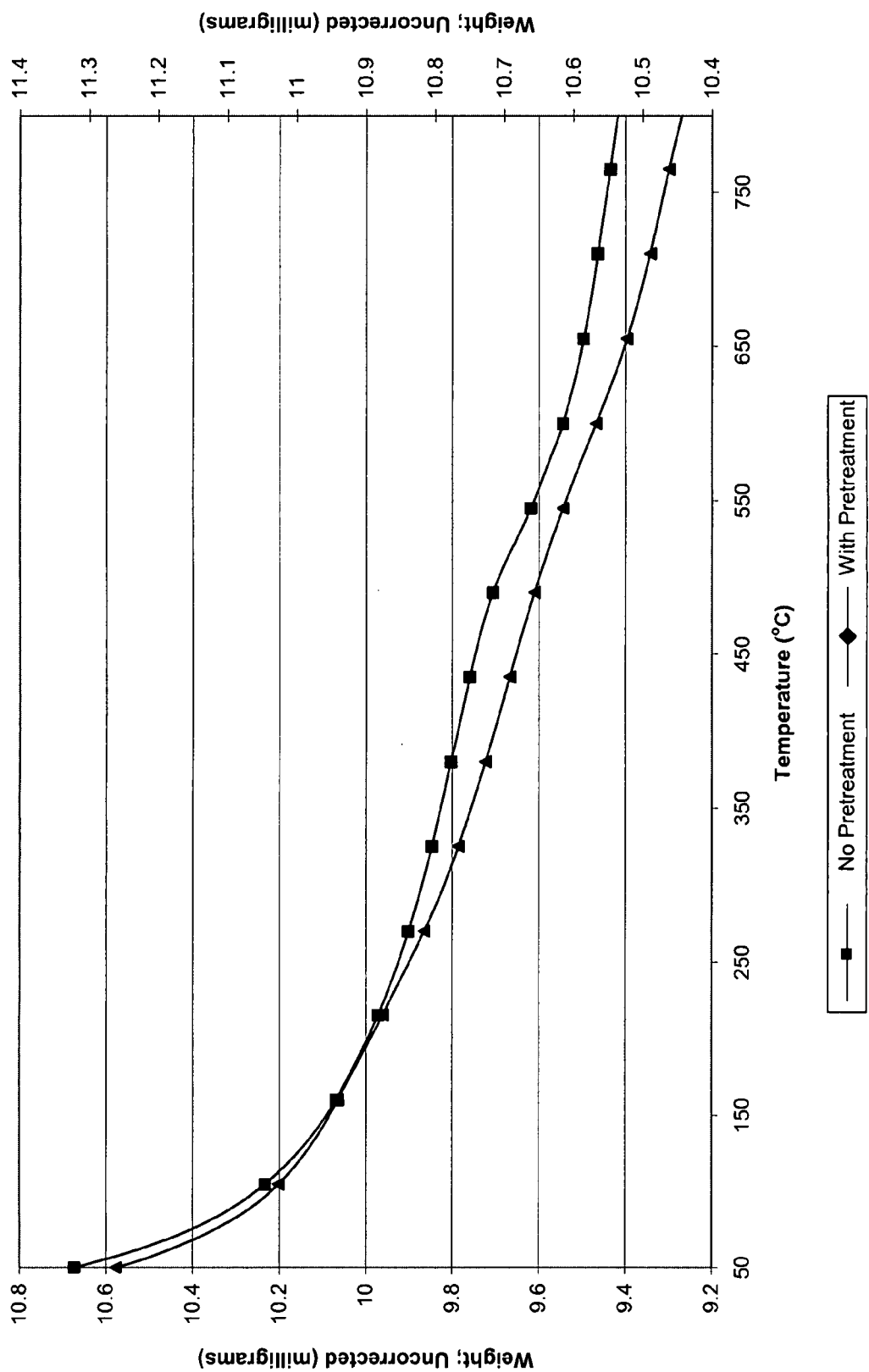
FIG. 2 is a graphical representation of the thermogravimetric analysis (TGA) of used alumina sample AA-199, as described in Example 6.
Figure 3:
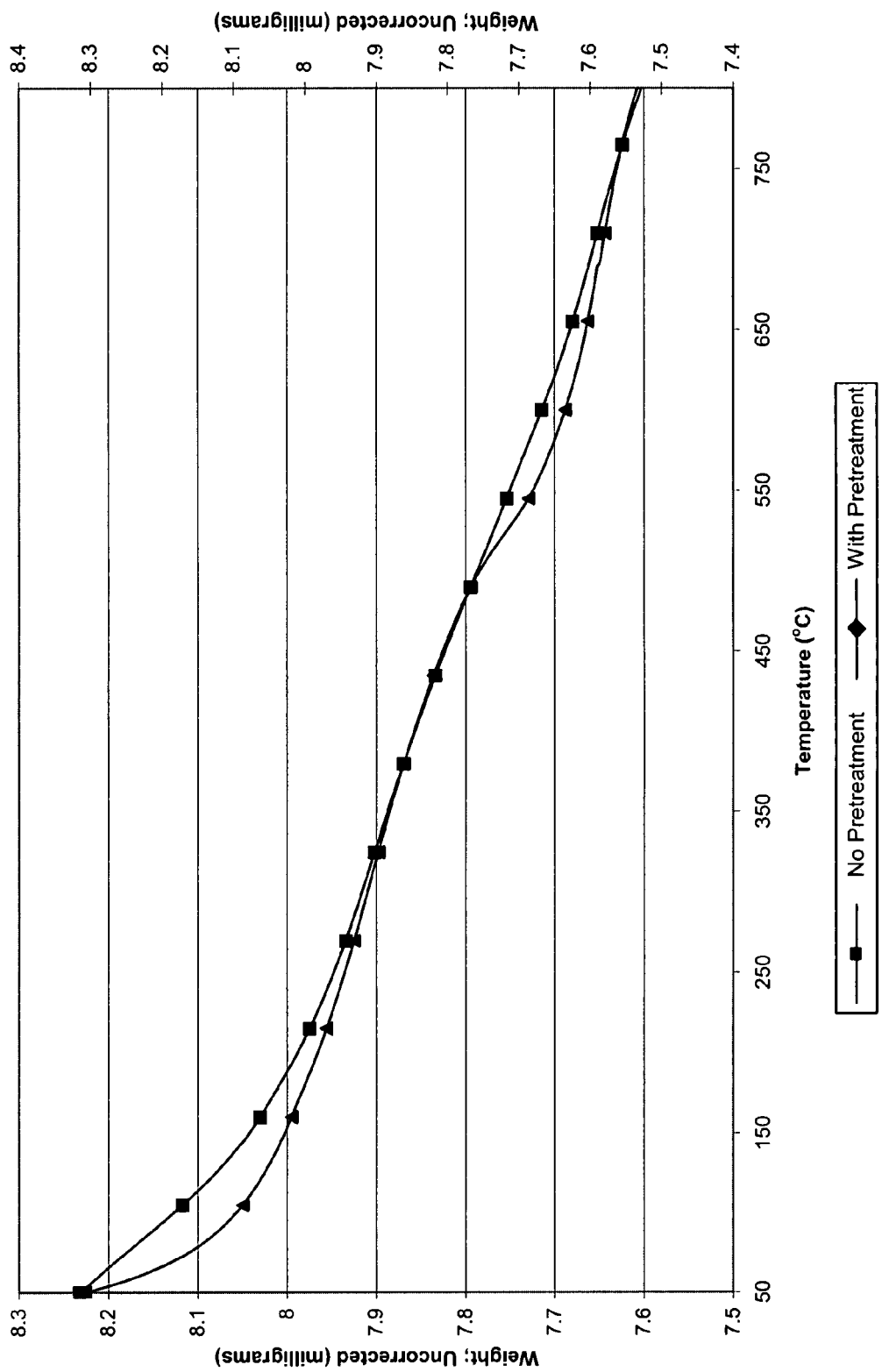
FIG. 3 is a graphical representation of the thermogravimetric analysis (TGA) of used alumina sample AA-222, as described in Example 6.
Figure 4:
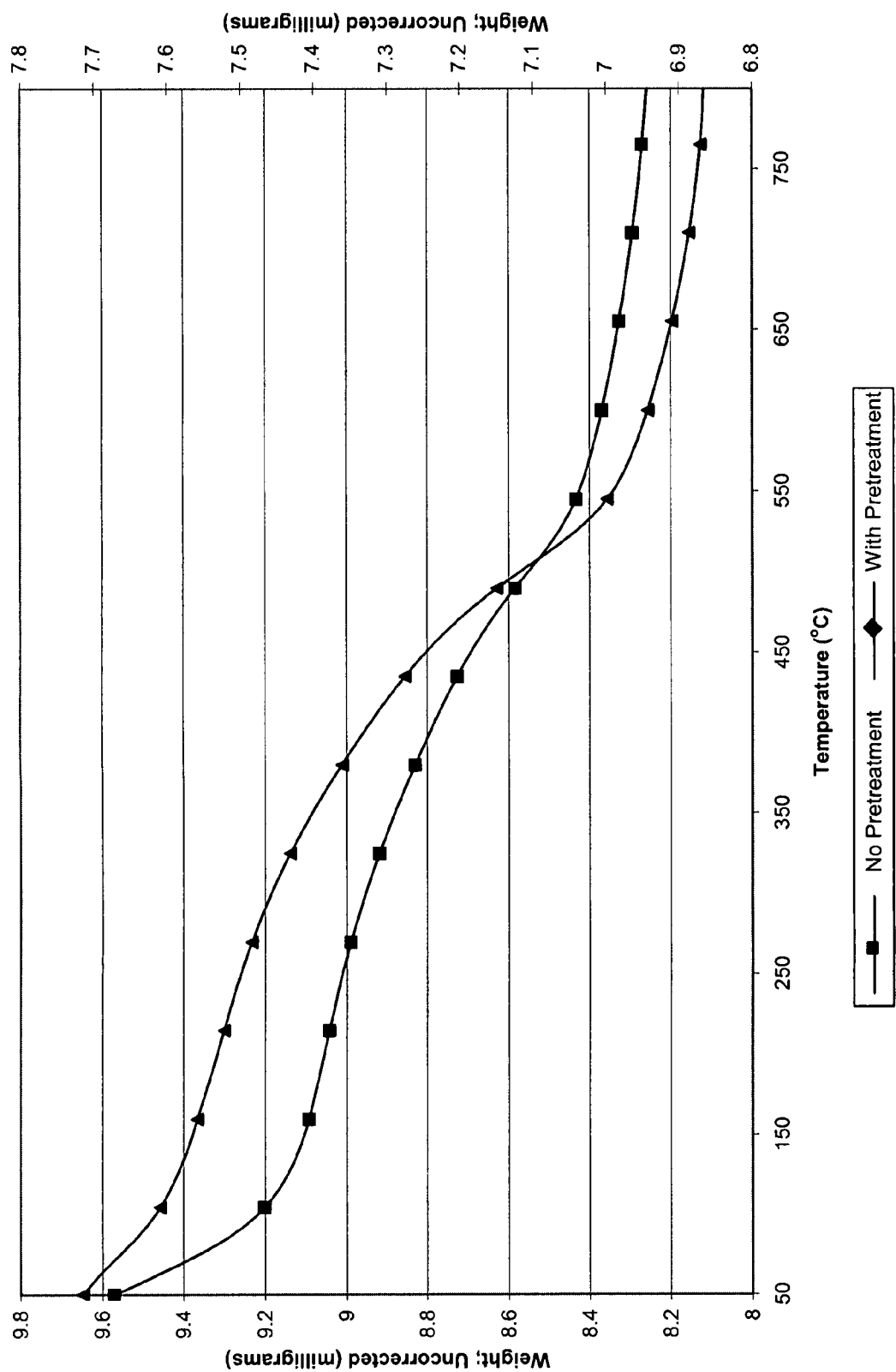
FIG. 4 is a graphical representation of the thermogravimetric analysis (TGA) of used alumina sample AA-246, as described in Example 6.

The TGA profiles of used alumina samples AA-199 and AA-222 (FIGS. 2 and 3, respectively) were similar to those of the virgin material, which demonstrate a gradual decrease in mass over the temperature range. These data confirm a lower quantity of sulfur present in these materials compared to AA-246 and AA-191 (FIGS. 4 and 1, respectively), whose profiles were qualitatively different from the other samples. The TGA spectrum for AA-191 showed a sharp decrease in mass starting at approximately 250° C. and ending at approximately 325° C. Sample AA-246 also showed a decrease in this range, although the change was not as sharp as observed for AA-191.

The low initial temperature loss (~250° C.) demonstrates that the sulfur species is predominately physically sorbed to the surface of the alumina, most likely via Van der Waals and/or London Dispersion Forces. Chemical bonding of the sulfur to the alumina would result in higher initial temperature loss (~300° C.).

Example 7

Determination of Sulfur Content in Used Alumina Samples by Elemental Analysis

Elemental analysis was performed on the used alumina samples, virgin material and activated carbon, to determine percent sulfur content. The calculations used in the analysis were adjusted because the system did not afford complete combustion. First, it was assumed that the total mass lost was the entire mass of the organics present on the sample (i.e., eliminating the sulfur present). Second, it was assumed that the only organic moiety lost was sulfur, not carbon, hydrogen or oxygen. Because there was no coke formation on the used Claus catalysts, and the TGA analysis did not reveal the presence of other organic substances, this assumption was valid.

In the experiment, a known quantity of sample was introduced into the sample pan (weighing apparatus) on a section of aluminum foil. After weighing, the foil was crimped to encase the sample. The foil-encased sample was then introduced into the heating chamber. The sample was heated to a temperature of 800° C. to insure complete combustion. The final weight was also measured and the amount lost is the quantity which was lost. Samples were analyzed on a Perkin-Elmer Analyst 1100 Series. The data are provided in Table 5.

TABLE 5

Elemental Analysis of Used Alumina Samples

| Sample | % Sulfur |
|---|---|
| Maxcell 727 | 0.0 |
| UOP S-201 | 0.0 |
| AA-199 | >1 |
| AA-246 | 1.8 |
| AA-222 | 1.5 |
| AA-191 | 22.5 |

These data confirm that sample AA-191 has the highest sulfur content of the used alumina samples. These data also confirm that the other used alumina samples contain detectable quantities of sulfur.

Example 8

Sorption Experimentation

Sorption experiments were performed to determine the kinetics and capacity for mercury removal of the used alumina samples. Two used alumina samples, AA-191 and AA-222 were evaluated. Virgin alumina (Maxcell and UOP S-201) was analyzed as a control. The ability of the used alumina samples to remove mercury was compared to the carbonaceous material, Mersorb and Selexsorb. A system control comprising a known concentration of mercury in water was also analyzed. This sample was used to ensure that the disappearance of mercury was not attributed to precipitation. There was no decrease in mercury concentration in these samples. Thus, the removal of mercury is not attributed to precipitation.

Figure 5:
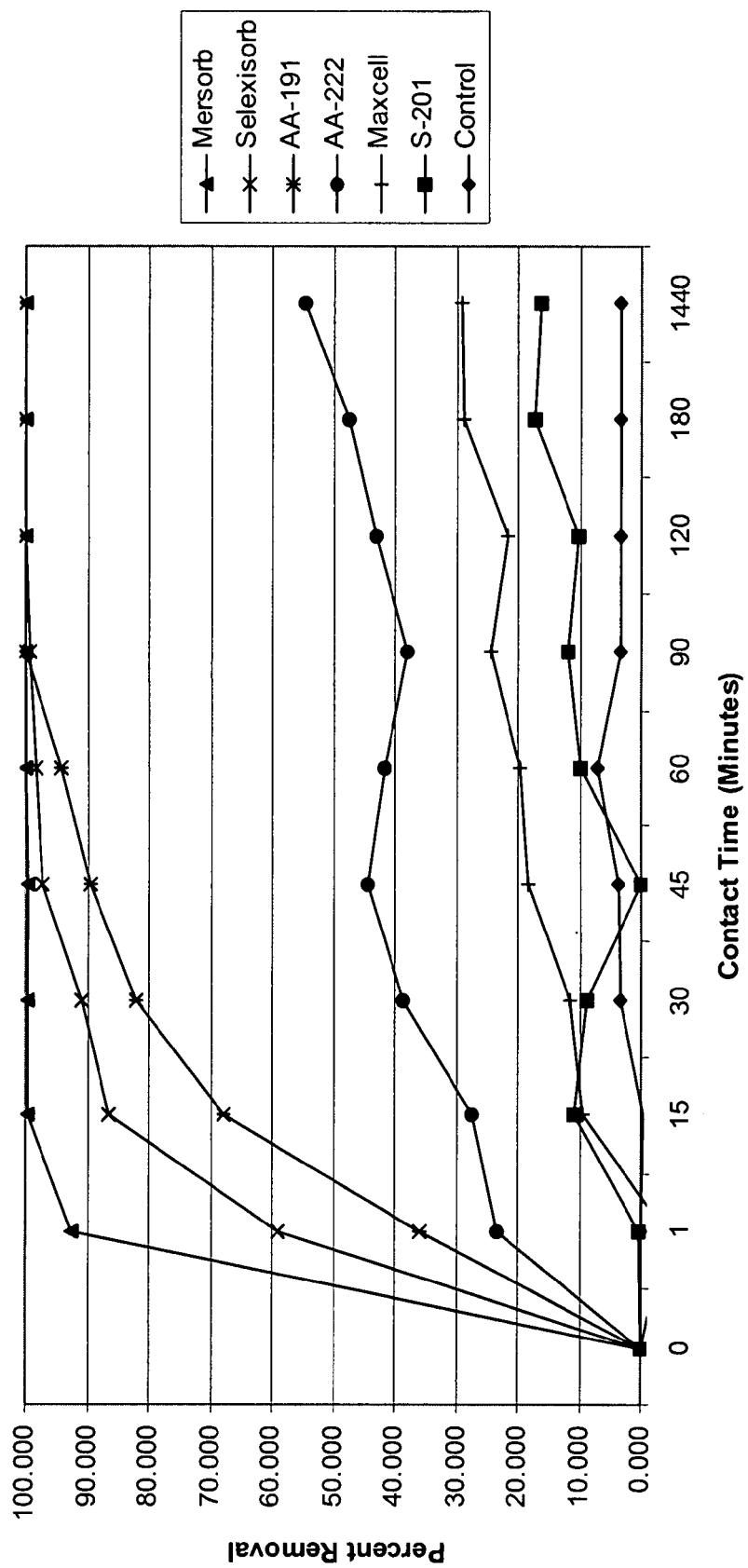
FIG. 5 is a graphical representation depicting the percent removal of 10 ppm mercury from 1 g of various sorbents, as described in Example 8.
Figure 6:
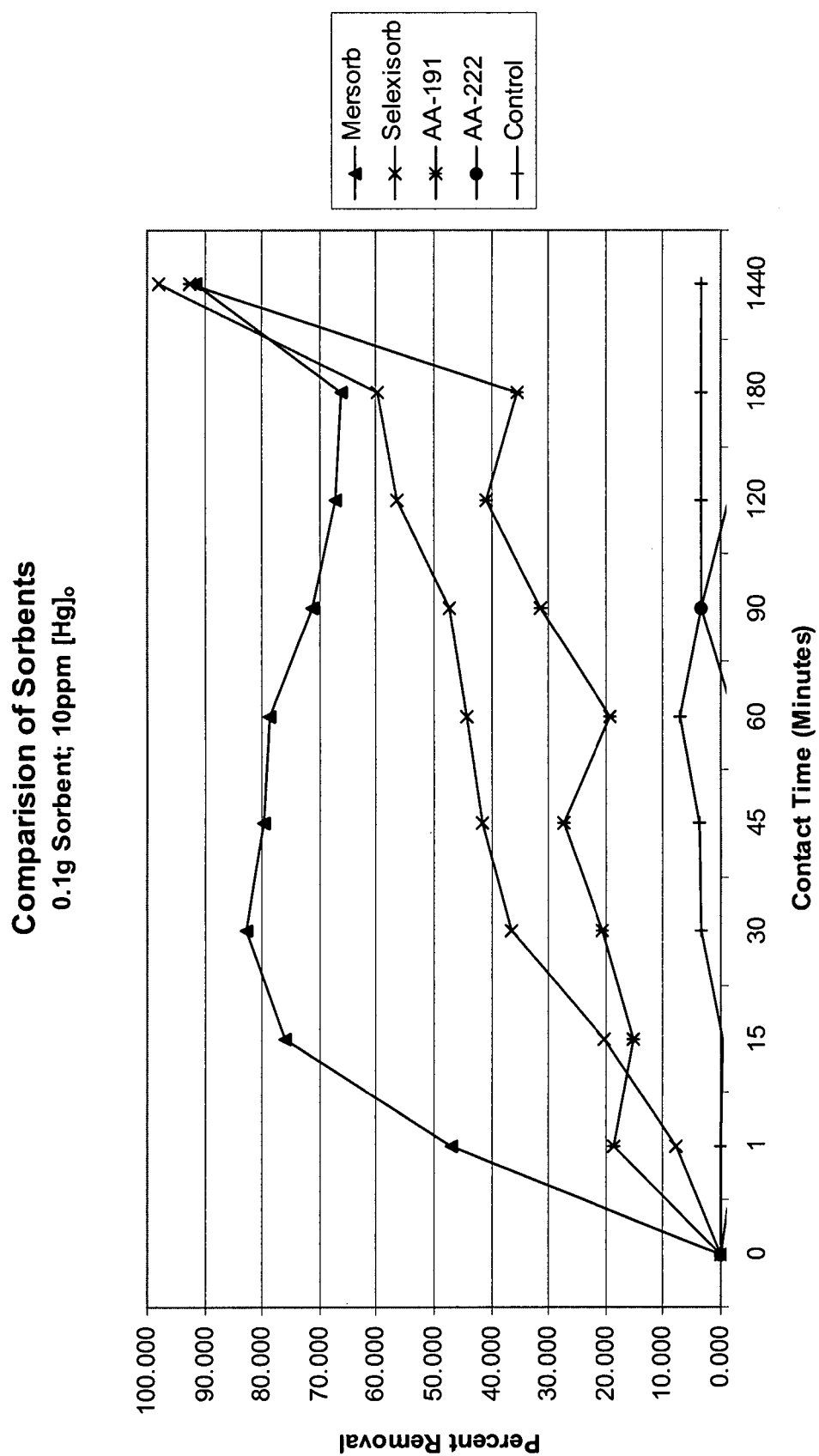
FIG. 6 is a graphical representation depicting the percent removal of 10 ppm mercury from 0.1 g of various sorbents, as described in Example 8.

The samples were exposed to a laboratory prepared solution containing 10 ppm mercury(II). The experiments were performed as described above, Example 1. In one experiment, 0.1 g of sorbent was used. In a second experiment, 1.0 g of sorbent were used. The sorbent material was powdered to allow for maximum surface area. The reaction was allowed to proceed for a period of time up to twenty-four hours, with samples taken at predetermined times to determine the reaction kinetics. During the reaction, the samples were shaken horizontally. The data are shown below in Table 6 and FIGS. 5 and 6.

TABLE 6

Sorption of Mercury using 1.0 g Sorbent

| Sorbent Material | % Removed after 1 min. | Max. Hg Removed (ppm) | Max. Removal Efficiency (%) | Time Needed to Reach Max. Removal (min.) |
|---|---|---|---|---|
| Maxcell[1] | 0.0 | 2.60 | 29.2 | 1440 |
| UOP S-201[1] | 0.5 | 1.41 | 16.3 | 1440 |
| Mersorb[2] | 92.5 | 9.853 | 100 | 90 |
| Selexsorb[2] | 59.1 | 8.845 | 100 | 180 |
| AA-191 | 36.1 | 10.4 | 100 | 90 |
| AA-222 | 23.5 | 5.8 | 54.7 | 1440 |

[1]Virgin alumina
[2]Activated carbon sorbent

These data confirm the effective removal of mercury from aqueous samples using used alumina as a sorbent. These data also suggest that the kinetics of removal and the total capacity of the sorbent for removal increases as the sulfur content increases in the material. The used alumina sorbent used for this experiment, A-191 and A-222 contain approximately 20% and 2% sulfur, respectively. Mercury removal for the used alumina sorbent is comparable to the commercially available carbonaceous sorbents.

Example 9

Removal of Arsenic using Used Alumina as Sorbent

The removal of ionic arsenic(V) using used alumina was demonstrated using laboratory synthesized aqueous metal-tainted solutions. The solutions contained 100 ppm and 1000 ppm arsenic(V) (Na-arsenate). Activated carbon sorbents, Mersorb and Selexsorb, were included for comparison purposes. Virgin alumina samples UOP S-201 and Maxcell 727 were included as controls.

Activated alumina was first dried by placing the sorbent in drying oven, at 100° C., for approximately 4 hours. After drying, 0.2 g of each sorbent was weighed. The sorbent was added to 0.01 L of metal solution and the contents of each bottle were manually swirled to assure wetting of all of the sorbent. When the arsenic concentration was 100 ppm, the pH was fixed at pH 7. When the arsenic concentration was 1000 ppm, the pH of the samples varied from pH 6.6 to pH 10.1. The bottles were agitated for a period up to 24 hours. The temperature and final pH of each bottle was recorded before the samples were filtered and diluted.

The amount of arsenic remaining in each sample was determined by inductively coupled plasma (ICP) spectroscopy. Approximately 2-3 mL of laboratory synthesized aqueous metal-tainted sample were removed from each bottle and the sorbent was filtered from the solution. In an analytical vessel, 1 mL of sample was diluted to a total volume of 10 mL with 2% nitric acid. The sample was then introduced to the ICP via a peristaltic pump and delivered as an aerosol into the plasma source. The instrument, a Perkin-Elmer 3000 ICP, then scanned a large series of wavelengths to identify which elements were present. Each element has a specific energy and is assimilated to a fingerprint. A calibration curve is assembled prior to analysis using four know concentrations and the point fit by linear regression. The instrument retains this curve and then calculates the unknown's concentration using this curve. The results are shown below in Table 7, below.

TABLE 7

Removal of Arsenic(V)

| | % Arsenic(V) Sorbed | |
|---|---|---|
| Sample | 100 ppm | 1000 ppm |
| UOP S-201 | 100 | 65 |
| Maxcell 727 | 100 | 65 |
| Mersorb | 24 | 50 |
| Selexsorb | 54 | 61 |
| AA-199 | 100 | 71 |
| AA-222 | 100 | 75 |
| AA-246 | 100 | 60 |
| AA-191 | 62 | 62 |

These data demonstrate that used alumina is an effective sorbent for arsenic. These data also suggest that lower levels of sulfur present in the sorbent result in improved sorption of arsenic.

While the foregoing invention has been described in some detail for purposes of clarity and understanding, these particular embodiments are to be considered as illustrative and not restrictive. It will be appreciated by one skilled in the art from a reading of this disclosure that various changes in form and detail can be made without departing from the true scope of the invention and appended claims.

We claim:

1. A process for reducing the level of arsenic from a liquid stream comprising contacting said liquid stream with used alumina, wherein the used alumina is used Claus catalyst having a sulfur concentration of 0.1% -2.0% by weight, and wherein the liquid stream is an aqueous stream.

2. A process for reducing the level of arsenic from a liquid stream containing arsenic, comprising the steps of:
  (a) flowing the liquid stream through a bed containing a sorbent, wherein the sorbent comprises used alumina, wherein the used alumina is used Claus catalyst having a sulfur concentration of 0.1% -2.0% by weight, and wherein the liquid stream is an aqueous stream;
  (b) sorbing arsenic from the liquid stream onto the surface of the sorbent; and
  (c) allowing the arsenic-depleted effluent stream to exit from the outlet of the bed.

3. The process of claim 1, wherein the used alumina is crushed prior to contacting said liquid stream.

4. The process of claim 3, wherein the used alumina is heated to remove moisture prior to contacting said liquid stream.

5. The process of claim 1, wherein at least about 50% of arsenic is removed from said liquid stream.

6. The process of claim 1, wherein at least about 75% of arsenic is removed from said liquid stream.

7. The process of claim 1, wherein at least about 90% of arsenic is removed from said liquid stream.

8. The process of claim 1, wherein the arsenic is elemental arsenic.

9. The process of claim 1, wherein the arsenic is ionic arsenic.

10. The process of claim 1, wherein the arsenic is arsenic (V).

11. The process of claim 2, wherein the used alumina is crushed prior to being loaded on the bed.

12. The process of claim 11, wherein the used alumina is heated to remove moisture prior to being loaded on the bed.

13. The process of claim 2, wherein at least about 50% of arsenic is removed from said liquid stream.

14. The process of claim 2, wherein at least about 75% of arsenic is removed from said liquid stream.

15. The process of claim 2, wherein at least about 90% of arsenic is removed from said liquid stream.

16. The process of claim 2, wherein the arsenic is elemental arsenic.

17. The process of claim 2, wherein the arsenic is ionic arsenic.

18. The process of claim 2, wherein the arsenic is arsenic (V).

* * * * *